(12) United States Patent
Shiozaki et al.

(10) Patent No.: US 11,833,803 B2
(45) Date of Patent: Dec. 5, 2023

(54) FIBER REINFORCED PLASTIC MOLDED BODY

(71) Applicant: Toray Industries, Inc., Tokyo (JP)

(72) Inventors: Keisuke Shiozaki, Nagoya (JP); Hiroyuki Nakayama, Nagoya (JP); Kosuke Shiho, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 146 days.

(21) Appl. No.: 17/599,839

(22) PCT Filed: Feb. 25, 2020

(86) PCT No.: PCT/JP2020/007415
§ 371 (c)(1),
(2) Date: Sep. 29, 2021

(87) PCT Pub. No.: WO2020/202903
PCT Pub. Date: Oct. 8, 2020

(65) Prior Publication Data
US 2022/0168993 A1    Jun. 2, 2022

(30) Foreign Application Priority Data
Mar. 29, 2019   (JP) .................................. 2019-065921

(51) Int. Cl.
*B32B 5/26*         (2006.01)
*B29C 70/08*       (2006.01)
(Continued)

(52) U.S. Cl.
CPC .......... *B32B 5/262* (2021.05); *B29C 45/0005* (2013.01); *B29C 70/081* (2013.01);
(Continued)

(58) Field of Classification Search
CPC .......... B32B 5/262; B32B 5/024; B32B 3/02; B32B 3/08; B29C 70/086
See application file for complete search history.

(56) References Cited

U.S. PATENT DOCUMENTS 5,529,826 A * 6/1996 Tailor .................... B32B 27/302
428/36.1
6,429,157 B1 * 8/2002 Kishi ...................... B32B 27/12
428/116
(Continued)

FOREIGN PATENT DOCUMENTS

JP   SHO61-24439 A   2/1986
JP   2003-158143 A   5/2003
(Continued)

*Primary Examiner* — Jasper Saberi
(74) *Attorney, Agent, or Firm* — DLA Piper LLP (US)

(57) ABSTRACT

A fiber reinforced plastic molded body includes a layered body, a resin member, unidirectional fiber reinforced resins each constituted from a unidirectional continuous fiber, a matrix resin, and a woven fabric fiber reinforced resin of one or two or more layers, wherein when the layered body is divided into equal halves in its thickness direction, an amount of the resin member present in a region (R1) which is a side from a dividing center line whereon the woven fabric fiber reinforced resin is layered is referred to as Am1, and an amount of the resin member present in a region (R2) which is a side whereon the woven fabric fiber reinforced resin is not layered is referred to as Am2, Am2/Am1 is 2 to 25.

11 Claims, 8 Drawing Sheets

(51) Int. Cl.
    *B29C 70/34*         (2006.01)
    *B32B 5/02*          (2006.01)
    *B32B 5/12*          (2006.01)
    *B32B 5/24*          (2006.01)
    *B32B 27/12*        (2006.01)
    *B32B 27/20*        (2006.01)
    *B32B 3/08*          (2006.01)
    *B32B 3/02*          (2006.01)
    *B29C 45/00*        (2006.01)
    *B29K 23/00*        (2006.01)
    *B29K 105/08*      (2006.01)

(52) U.S. Cl.
    CPC .......... *B29C 70/086* (2013.01); *B29C 70/345* (2013.01); *B32B 3/02* (2013.01); *B32B 3/08* (2013.01); *B32B 5/024* (2013.01); *B32B 5/12* (2013.01); *B32B 5/245* (2013.01); *B32B 27/12* (2013.01); *B32B 27/20* (2013.01); *B29K 2023/12* (2013.01); *B29K 2105/0881* (2013.01)

(56) References Cited

U.S. PATENT DOCUMENTS

| | | |
|---|---|---|
| 2016/0214346 A1* | 7/2016 | Hatanaka ............ B29C 45/1642 |
| 2019/0009497 A1 | 1/2019 | Sasaki et al. |
| 2019/0389174 A1 | 12/2019 | Sasaki et al. |
| 2021/0162638 A1 | 6/2021 | Takahashi et al. |

FOREIGN PATENT DOCUMENTS

| | | | |
|---|---|---|---|
| JP | 2006-130862 A | | 5/2006 |
| JP | 2007-038519 A | | 2/2007 |
| JP | 2007038519 A | * | 2/2007 |
| JP | 2009-173027 A | | 8/2009 |
| JP | 2010-046939 A | | 3/2010 |
| JP | 2010-131804 A | | 6/2010 |
| JP | 2012-076464 A | | 4/2012 |
| JP | 2015-098173 A | | 5/2015 |
| JP | 2015-193119 A | | 11/2015 |
| JP | 2010-046940 A | | 3/2020 |
| WO | 2017/115640 A1 | | 7/2017 |
| WO | 2018/110293 A1 | | 6/2018 |
| WO | 2019/235299 A1 | | 12/2019 |

* cited by examiner

FIBER REINFORCED PLASTIC MOLDED BODY

TECHNICAL FIELD

This disclosure relates to a fiber reinforced plastic molded body suitable for applications requiring light weight, high strength, high rigidity, and thinning, which are used as parts and housing parts of, for example, personal computers, OA (Office Automation) devices, and mobile phones.

BACKGROUND

As electric and electronic devices such as personal computers, OA devices, AV (Audio Visual) devices, mobile phones, telephones, facsimiles, home appliances and toy supplies are becoming more portable, smaller size and lighter weight are required. To achieve this requirement, since the parts that make up the equipment, especially the housing, need to be prevented from deflecting significantly and coming into contact with or breaking internal parts when an external load is applied, it is required to reduce the thickness while achieving high strength and high rigidity.

Further, since the housing that houses electronic devices such as notebook-type personal computers is a part that is seen by the human eye and directly touched by the user's hands, the design property and the appearance quality of its surface are important. Therefore, the housing is generally decorated by exterior painting, and the surface quality is managed by strict appearance standards. In recent years, the diversification of design properties such as clear metallic painting and pearl clear painting has progressed, and advanced painting technology is required to satisfy the surface quality, and the quality required for the surface of a molded product is becoming stricter. In particular, it is considered to be also an important factor for sales promotion to make the shape pattern of carbon fiber woven fabric, which is a fiber reinforced base material, conspicuous and to make its novel surface pattern a selling point.

JP-A-2015-193119 describes a structure wherein "in a fiber reinforced plastic layered body in which, at least, a skin material made of reinforcing fibers and a matrix resin is layered on a core material made of a resin foam having independent foam cells, a unidirectional fiber reinforced plastic layer is arranged in at least one layer of thin skin materials, each thick skin material has a layered structure and a woven fabric fiber reinforced plastic layer is arranged in at least one layer thereof, and as the upper surface skin material, at the outermost layer position one layer of prepreg A composed of woven fabric carbon fibers and epoxy resin, and at a position thereunder four layers of prepreg B composed of unidirectional carbon fibers and epoxy resin, are layered," and discloses an effect wherein, by that structure, while holding the rigidity and the light-weight property, surface appearance defects due to the generation of bubble gaps, so-called bubble voids, which are generated inside the structure, can be suppressed, a surface state having a good appearance with excellent design property can be maintained.

Further, WO 2018/110293 describes a structure wherein "a plate material (A) having a design surface on one side is arranged in a mold at a position inside a member (B) having a frame shape with at least a part distanced from the member (B), and by injection molding a joining resin (C) into the gap between the plate material (A) and the member (B), the plate material (A) and the member (B) are joined to and integrated with each other at least at the outer peripheral edge portion of the plate material (A)," and discloses an effect wherein, by that structure, a plurality of structures are joined with a high joining strength, the joining boundary portion has a good smoothness, and even if the molded body has a structural member of a plate material, the warping can be reduced and the weight and thickness can be reduced.

Further, JP-A-SHO 61-24439 describes a structure wherein "a composite molded product (I) comprising a layered member (II) having a sandwich structure and a resin member (III) arranged at least at a part of a portion around a plate end portion of the laminated member (II), in which the sandwich structure has a hard member layer (IIa) and a soft member layer (IIb), and in the joining portion between the layered member (II) and the resin member (III), at least a part of the resin member (III) forms a convex shape with respect to the soft member layer (IIb)," and discloses an effect wherein, by that structure, it may be able to achieve to be lightweight, high-rigidity, high-strength, and small-thickness.

Further, WO 2017/115640 describes a structure wherein "in a sandwich structure composed of skin layers and a core layer including a flowable core layer composed of discontinuous fibers and a matrix resin (C), the skin layer is a fiber reinforced resin layer (X) composed of continuous fibers and a matrix resin (A), and has a structure in which one or more layers of a unidirectional fiber reinforced resin layer and a woven fabric fiber reinforced resin layer are layered, respectively," and discloses an effect wherein it is lightweight, high-strength and high-rigidity, and a high-strength standing portion having a complicated shape such as a rib extending in the out-of-plane direction of the skin layer can be formed by a simple method such as a one-shot molding.

Furthermore, JP-A-2012-76464 describes a structure wherein "in a method for producing a sandwich panel composed of a core material and skin materials arranged on both sides of the core material, each including a fiber reinforced resin in which reinforcing fibers are impregnated with a matrix resin, the skin material is a fiber reinforced resin layer having a one-layer structure or a multi-layer layered structure, and at least one layer in the fiber reinforced resin is a fiber reinforced resin layer containing continuous reinforcing fibers, and the continuous reinforcing fiber-containing fiber reinforced resin layer contains a woven fabric of reinforcing fibers," and discloses an effect wherein, by that structure, since the skin material is composed of a high-rigidity fiber reinforced resin and the core material is composed of a resin with an apparent density lower than that of the skin material and the overall thickness is reduced, the lightness and X-ray transparency are excellent while maintaining the rigidity.

For a surface of a housing used for electrical and electronic equipment, high design property of the external appearance and smoothness are required to a member which constitutes an equipment such as the housing or the like. For example, attempts have been made to enhance the design property of the external appearance by arranging a sheet-like fiber reinforced base material such as a woven fabric on the surface of a fiber reinforced plastic molded body to give a peculiar surface form. However, in a fiber reinforced plastic molded body, if a sheet-like woven fabric fiber reinforced base material such as a multi-axis woven fabric is used for the surface layer, a woven fabric pattern can be arranged on the surface, but because the woven fabric has a form in which carbon fibers are wavy, the strength such as flexural rigidity may decrease.

Therefore, although it is possible to secure a certain level of strength and rigidity by forming the fiber reinforced plastic as a multi-layer structure with a reinforcing base material and a sheet-like woven fabric fiber reinforced base material such as a woven fabric or a multi-axis woven fabric, the molded body becomes an asymmetric layered structure in the thickness direction, and warping may occur in the molded body itself due to the influence of heat shrinkage after molding.

Further, to solve this problem, a method of preliminarily forming a cavity of a mold into a shape that cancels the warping deformation of the fiber reinforced resin plate material caused by the difference in the coefficient of linear expansion is disclosed (for example, JP-A-2015-98173, JP-A-2003-158143). However, it is necessary to make the mold as a custom-made mold, and further, it is necessary to perform a plurality of trial productions to confirm whether the shape is appropriate, and they have been factors that cause an increase in cost.

With respect to such problems, the above-described JP '119 describes that, by arranging a skin material of a unidirectional fiber reinforced plastic on both sides of a core material, the decrease in rigidity can be compensated and, further, by arranging a woven fabric as the outermost layer of the skin material, the design property of the external appearance can be improved while maintaining the high rigidity, but with respect to reduction of the warping of the molded body, which is likely to occur by forming the asymmetric layered structure, there is no recognition of the subject matter and no suggestion on a countermeasure therefor, and therefore, there has been a room for improvement.

Further, WO '293 describes an asymmetric layered structure in which a joining resin (C) injected into an outer peripheral edge portion of a plate material (A) aims to join the plate material (A) and a member (B) with a high strength, and further, a thermoplastic resin layer (D) is provided on the outer surface of the plate material (A) and the plate material (A) and the joining resin (C) are joined via the thermoplastic resin layer (D). However, there is no recognition with respect to the warping of molded body that may occur when the thermoplastic resin layer (D) is provided and the asymmetric layered structure is formed and no suggestion on a countermeasure therefor, and therefore, there has been a room for improvement.

Further, JP '439 describes a structure in which a hard member layer (IIa) uses a sheet containing continuous reinforcing fibers arranged in one direction or a sheet containing a continuous reinforcing fiber woven fabric, and a resin member (III) is injection molded around the plate end portion of a layered member (II). However, there is neither description of forming the layered member (II) as an asymmetric layered structure, nor description that suggests a relationship between the resin member (III) to be injection molded and the warping of the molded body, and there is no recognition of the subject matter relating to the warping of the molded body and no suggestion on a countermeasure therefor, and therefore, there has been a room for improvement.

Further, WO '640 describes that a skin layer is a fiber reinforced resin layer (X) composed of continuous fibers and a matrix resin (A), and by forming a structure in which one or more unidirectional fiber reinforced resin layers and one or more woven fabric fiber reinforced resin layers are layered, and it is possible to obtain lightweight, high-strength, and high-rigidity properties. However, there is no recognition with respect to the subject matter of the warping of molded body that may occur when the woven fabric fiber reinforced resin layer is arranged on the surface layer of the skin material to form an asymmetric layered structure and no suggestion on a countermeasure therefor, and therefore, there has been a room for improvement.

Furthermore, JP '464 describes that by a condition where a skin material has a fiber reinforced resin layer containing reinforcing fibers aligned in one direction or reinforcing fibers of a woven fabric, the strength and elastic modulus can be designed more efficiently. However, there is no recognition with respect to the subject matter of the warping of molded body that may occur when the woven fabric fiber reinforced resin layer is arranged on the surface layer of the skin material to form an asymmetric layered structure and no suggestion on a countermeasure therefor, and therefore, there has been a room for improvement.

In view of the problems of such conventional technologies, it could be helpful to provide a fiber reinforced plastic molded body in which a sheet-like woven fabric fiber reinforced base material is arranged on the surface of the fiber reinforced plastic molded body to give a peculiar surface form and enhance the design property of the external appearance, and despite the asymmetric layered structure, the occurrence of warping of the molded body is suppressed to realize a smoothness, and it can achieve to make the molded body thin, high-strength, and high-rigidity.

SUMMARY

We thus provide:
(1) A fiber reinforced plastic molded body constituted from a layered body (A) that is a planar structure body comprising at least a fiber reinforced resin, and a resin member (B) joined to a part of a region or the entirety of the region on an outer peripheral side-surface portion and/or an outer peripheral edge portion of the layered body (A),
   wherein the layered body (A) has a constitution comprising: a sandwich structure member (E) in which a core layer (C) is sandwiched on both surfaces thereof by unidirectional fiber reinforced resins (D) each constituted from a unidirectional continuous fiber and a matrix resin and each having one or two or more layers; and a woven fabric fiber reinforced resin (F) of one or two or more layers, constituted from a woven fabric fiber and a matrix resin and layered on a surface of one of the fiber reinforced resins (D), and when the layered body (A) is divided into equal halves in its thickness direction, an amount of the resin member (B) present in a region (R1) which is a side from a dividing center line whereon the woven fabric fiber reinforced resin (F) is layered is referred to as Am1, and an amount of the resin member (B) present in a region (R2) which is a side whereon the woven fabric fiber reinforced resin (F) is not layered is referred to as Am2, Am2/Am1 is 2 to 25.
(2) The fiber reinforced plastic molded body according to (1), wherein a flexural rigidity of the sandwich structure member (E) is larger than a flexural rigidity of the woven fabric fiber reinforced resin (F).
(3) The fiber reinforced plastic molded body according to (1) or (2), wherein, when a flexural modulus of the unidirectional fiber reinforced resin (D) is referred to as Md (GPa) and a flexural modulus of the woven fabric fiber reinforced resin (F) is referred to as Mf (GPa), Md/Mf is 1.2 to 17.
(4) The fiber reinforced plastic molded body according to any one of (1) to (3), wherein a flexural modulus Md of the unidirectional fiber reinforced resin (D) is 100 to 500 GPa, and a flexural modulus Mf of the woven fabric fiber reinforced resin (F) is 30 to 80 GPa.
(5) The fiber reinforced plastic molded body according to any one of (1) to (4), wherein, when a thickness of the sandwich structure member (E) is referred to as Te (mm) and a thickness of the woven fabric fiber reinforced resin (F) is referred to as Tf (mm), Te/Tf is 1.2 to 40.
(6) The fiber reinforced plastic molded body according to any one of (1) to (5), wherein a thickness Te of the sandwich structure member (E) is 0.6 to 2 mm, and a thickness Tf of the woven fabric fiber reinforced resin (F) is 0.05 to 0.5 mm.
(7) The fiber reinforced plastic molded body according to any one of (1) to (6), wherein the woven fabric fiber reinforced resin (F) is arranged as the outermost layer on a design surface side of the fiber reinforced plastic molded body.
(8) The fiber reinforced plastic molded body according to any one of (1) to (7), wherein the resin member (B) is joined and formed over the entire circumference of the outer peripheral side-surface portion and/or the outer peripheral edge portion of the layered body (A).
(9) The fiber reinforced plastic molded body according to any one of (1) to (8), wherein the resin member (B) is joined to the layered body (A) in a part of a region or the entirety of the region on a plane portion of the outer peripheral edge portion of the layered body (A), which is a side whereon the woven fabric fiber reinforced resin (F) is not layered, via a joining layer (G).
(10) The fiber reinforced plastic molded body according to any one of (1) to (9), wherein the core layer comprises a resin foam or a porous base material made from discontinuous fibers and a thermoplastic resin.
(11) The fiber reinforced plastic molded body according to any one of (1) to (10), wherein a warping of the fiber reinforced plastic molded body is 2% or less.

In the fiber reinforced plastic molded body, a peculiar surface form is given and the design property of the external appearance is enhanced by arranging a sheet-like fiber reinforced base material such as a woven fabric on the surface of the fiber reinforced plastic molded body, and despite the asymmetric layered structure, the occurrence of warping of the molded body can be suppressed to realize a smoothness, and it can be realized to make the molded body thin, high-strength, and high-rigidity.

EXPLANATION OF SYMBOLS

1: fiber reinforced plastic molded body
2: layered body (A)
3: resin member (B)
4: core material (C)
5: unidirectional fiber reinforced resin (D)
6: sandwich structure member (E)
7: woven fabric fiber reinforced resin (F)
7a: base material f woven fabric fiber
8: joining layer (G)
9: resin member (B) joined to flat surface of outer peripheral edge portion of layered body (A)
10: standing wall-shaped portion
11: thickness of layered body (A) 2
12: dividing center line
13: region (R1) on side whereon woven fabric fiber reinforced resin (F) is layered
14: region (R2) on side whereon woven fabric fiber reinforced resin (F) is not layered
21: press molding lower mold
22: press molding upper mold
23: injection molding lower mold
24: injection molding upper mold 25: injection gate port
26: space forming resin member (B)
30: flat plate
31: laser range finder
32: reference plane
33, 34: both end portions of molded body
35: warping lower reference line
36: warping upper reference line

DETAILED DESCRIPTION

Our molded bodies will be explained in detail with reference to drawings together with examples. The disclosure is, however, not limited to the drawings and examples.

As explained with reference to FIGS. 1 to 5, the fiber reinforced plastic molded body 1 is a fiber reinforced plastic molded body 1 constituted from a layered body (A) 2 that is a planar structure body comprising at least a fiber reinforced resin, and a resin member (B) 3 joined to a part of a region or the entirety of the region on an outer peripheral side-surface portion and/or an outer peripheral edge portion of the layered body (A) 2, wherein the layered body (A) 2 has a constitution comprising: a sandwich structure member (E) 6 in which a core layer (C) 4 is sandwiched on both surfaces thereof by unidirectional fiber reinforced resins (D) 5 each constituted from a unidirectional continuous fiber and a matrix resin and each having one or two or more layers; and a woven fabric fiber reinforced resin (F) 7 constituted from a woven fabric fiber and a matrix resin and layered on a surface of one of the fiber reinforced resins (D) 5, and when the layered body (A) 2 is divided into equal halves in the its direction of thickness 11, an amount of the resin member (B) 3 present in a region (R1) 13 which is a side from a dividing center line 12 whereon the woven fabric fiber reinforced resin (F) 7 is layered is referred to as Am1, and an amount of the resin member (B) 3 present in a region (R2) 14 which is a side whereon the woven fabric fiber reinforced resin (F) 7 is not layered is referred to as Am2, Am2/Am1 is 2 to 25.

Figure 1:
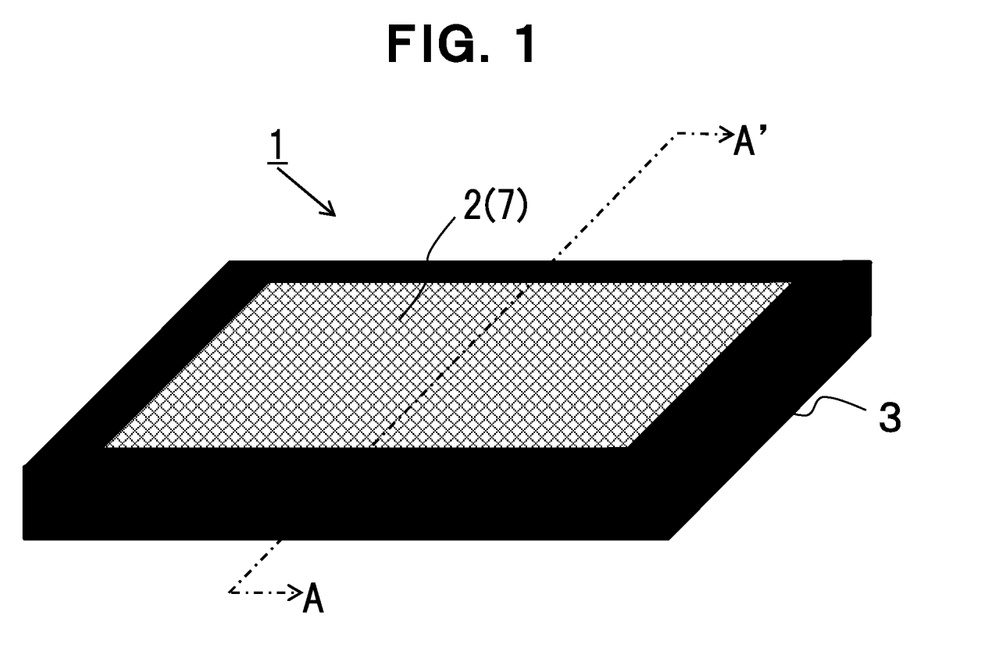
FIG. 1 is a perspective view of a fiber reinforced plastic molded body according to an example.
Figure 2:
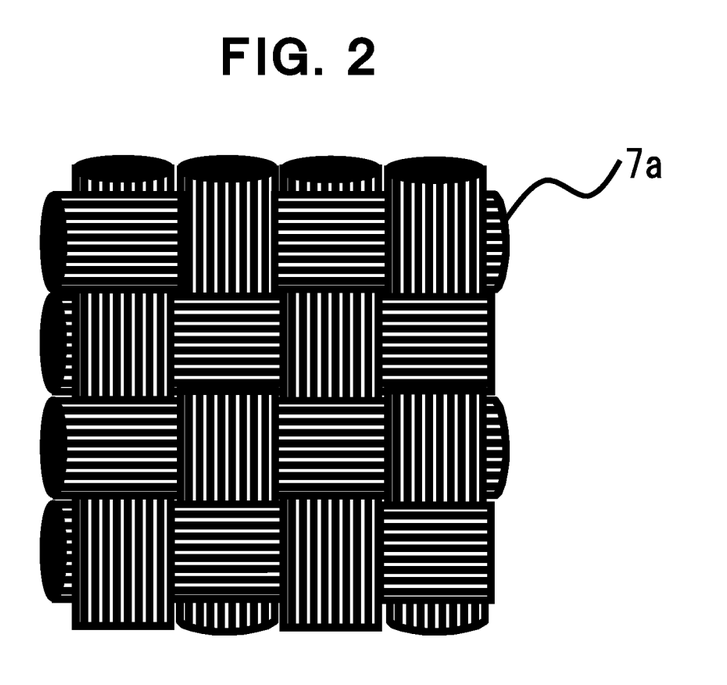
FIG. 2 is a plan view showing an example of a base material of woven fabric fibers.

As shown in FIG. 1, the fiber reinforced plastic molded body 1 has a constitution in which it includes the layered body (A) 2, the resin member (B) 3 is joined to a part of a region or the entirety of the region on an outer peripheral side-surface portion and/or an outer peripheral edge portion of the layered body (A) 2, and the woven fabric fiber reinforced resin (F) 7 using woven fabric fibers 7a as illustrated in FIG. 2 is layered on one surface of the layered body (A) 2. By arranging the woven fabric fiber reinforced resin (F) 7 as the surface layer of the layered body (A) 2, the shape pattern of the woven fabric is conspicuous, a peculiar surface form is given, and the design property of the external appearance can be enhanced.

Figure 3A:
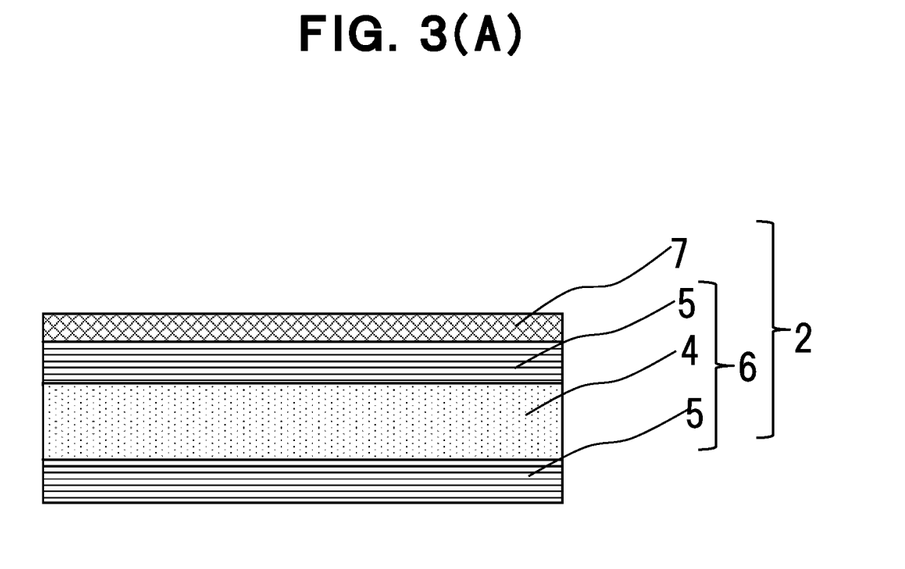
FIGS. 3(A) and (B) depict a cross-sectional view (A) showing an example of a layered body (A), and a cross-sectional view (B) showing an example of a state in which a warping occurs due to heat shrinkage after press molding of the layered body (A).
Figure 3B:
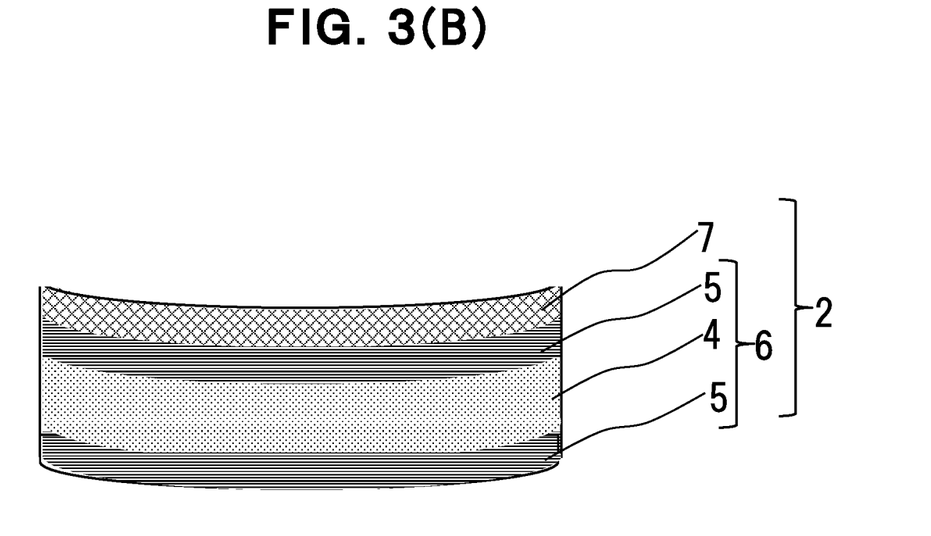

Next, as shown in FIG. 3(A), when both surfaces of the core layer (C) 4 are sandwiched by unidirectional fiber reinforced resins (D) 5, and further, woven fabric fiber reinforced resin (F) 7 is layered on one of the surfaces thereof, and layered body (A) 2 which is a planar structure body is formed by press molding, immediately after the completion of the press molding, there is no warping and the shape is approximately flat, but after that, by heat shrinkage due to cooling, there is a possibility in that the layered body (A) 2 may be deformed in a concave shape at the central part and in a convex shape downwardly as shown in FIG. 3(B). This is considered that, because the layered body (A) 2 has an asymmetric layered structure, it is affected by the heat shrinkage of the woven fabric fiber reinforced resin (F) 7 and it warps downward in a convex shape. If it is used as a housing or the like of an electric device in this state as it is, it may come into contact with an internal electronic component or the like and cause a problem.

Figure 4:
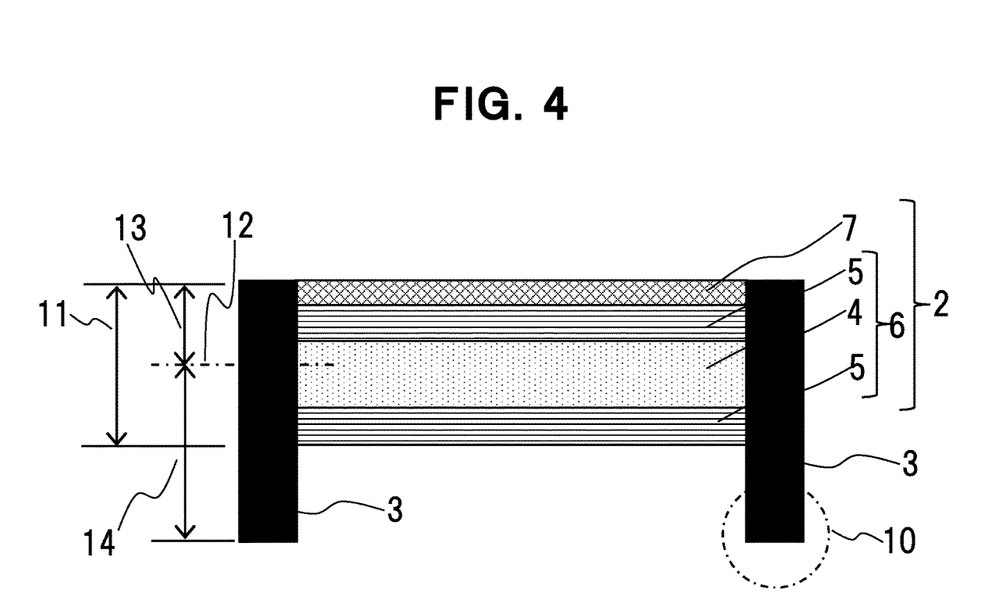
FIG. 4 is a cross-sectional view showing an example of a fiber reinforced plastic molded body as viewed along A-A' line of FIG. 1 in a state where a resin member (B) is joined to a side surface portion of a layered body (A).
Figure 5:
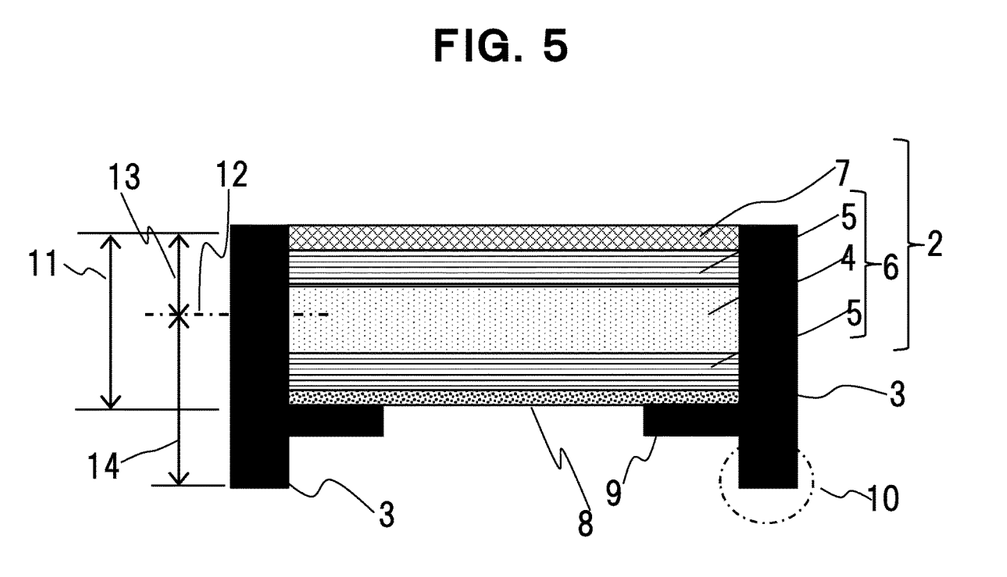
FIG. 5 is a cross-sectional view showing an example of a fiber reinforced plastic molded body in a state where a joining layer is formed on a surface of a unidirectional fiber reinforced resin (D) of a layered body (A) and a resin member (B) is joined to a side surface portion and a flat surface portion of an outer peripheral edge portion of the layered body (A).

Accordingly, to suppress this deformation as shown in FIG. 4 or 5, the resin member (B) 3 is joined to the outer peripheral side-surface portion and/or the outer peripheral edge portion of the layered body (A) 2 made by press molding. At this time, the constitution is employed wherein, when the layered body (A) 2 is divided into equal halves in the thickness direction, the amount of the resin member (B) 3 present in the region (R2) 14 which is a side from the dividing center line 12 whereon the woven fabric fiber reinforced resin (F) 7 is not layered is made greater than the amount of the resin member (B) 3 present in the region (R1) 13 which is a side whereon the woven fabric fiber reinforced resin (F) 7 is layered. By giving such a bias to the joining amount of the resin member (B) 3 joined to the outer peripheral edge portion and/or the outer peripheral side-surface portion of the molded body 1, by the shrinkage of the resin member (B) 3, a stress is generated in a direction opposite to the warping of the layered body (A) 2, and the warping is canceled out as a whole. As a result, it is possible to suppress the occurrence of warping during molding even with the asymmetric layered structure. In FIG. 4 or 5, the center line 12 is a line indicating the position of the central portion of the equal halves of the thickness 11 of the layered body (A) 2.

If the above-described Am2/Am1 is less than 2, it may be difficult to exhibit the effect of offsetting warping. If Am2/Am1 exceeds 25, the thickness of the molded body itself becomes thick, and there it may be difficult to realize thinning Am2/Am1 is preferably 5 to 22, more preferably Am2/Am1 is 8 to 20, and further preferably 10 to 18. It is preferred that the resin member (B) 3 is joined to the outer peripheral side-surface portion of the layered body (A) 2 by injection molding. Further, the above-described amount of the resin member (B) 3 is defined by volume.

As the unidirectional continuous fiber of the unidirectional fiber reinforced resins (D) 5 shown in FIG. 4 or 5, a constitution is preferably employed wherein two or more layers of continuous fiber base materials different in fiber orientation angle by 45 degrees or 90 degrees from each other are layered, and by this, it becomes possible to impart a certain level of rigidity and strength as well as to reduce the thickness and weight of the molded body.

The outer peripheral edge portion of the layered body (A) 2 means a plane portion region near the outer peripheral portion of the layered body (A) 2 of the planar structure body, and it is preferably 0 to 15% in length from the outer peripheral edge relative to the length of one side of the layered body (A) 2. The outer peripheral side-surface portion means an end surface portion having a plane perpendicular to the plane portion of the outer peripheral portion of the layered body (A) 2 of the planar structure body.

The resin member (B) 3 is arranged to be joined to a part of a region or the entirety of the region on the outer peripheral side-surface portion and/or the outer peripheral edge portion of this layered body (A) 2. In the example shown in FIG. 4, a state in which a part of the resin member (B) 3 is joined to the outer peripheral side-surface portion of the layered body (A) 2 is shown, and in the example shown in FIG. 5, a state in which a part of the resin member (B) 3 is joined to the outer peripheral side-surface portion and a part of the outer peripheral edge portion of the layered body (A) 2.

As the reinforcing fibers used for the unidirectional fiber reinforced resin (D) 5 and the woven fabric fiber reinforced resin (F) 7, high-strength and high-elastic modulus fibers such as carbon fibers, glass fibers, alumina fibers, silicon carbide fibers, boron fibers, silicon carbide fibers and the like are exemplified. To ensure a light-weight property while maintaining a high rigidity, it is preferred to use carbon fibers high in specific elastic modulus, which is a ratio of elastic modulus to density, and, for example, polyacrylonitrile (PAN)-based, pitch-based, cellulose-based, and vapor-phase growth carbon fibers applied with hydrocarbon, graphite fibers and the like can be used, and two or more of these may be used in combination. Preferably, PAN-based carbon fibers excellent in balance between rigidity and price are preferred. It is preferred that the flexural rigidity of the sandwich structure member (E) 6 is larger than the flexural rigidity of the woven fabric fiber reinforced resin (F) 7.

By layering the sandwich structure member (E) 6 having a high flexural rigidity, the strength of the molded body 1 can be ensured, and even if it is an asymmetric layered structure, the occurrence of warping can be suppressed as much as possible.

Flexural rigidity is expressed by rigidity=elastic modulus×moment of inertia of area, and it indicates the difficulty of deformation of a member with respect to bending and torsion. Therefore, by defining this flexural rigidity, the relationship with warping can be expressed in consideration of the thickness and shape of a base material.

When the flexural modulus of the unidirectional fiber reinforced resins (D) 5 is referred to as Md (GPa) and the flexural modulus of the woven fabric fiber reinforced resin (F) 7 is referred to as Mf (GPa), Md/Mf is preferably 1.2 to 17. By this, the strength of the molded body can be ensured, and the effect of offsetting the warping can be obtained.

If Md/Mf is less than 1.2, the effect of warping reduction may be weakened. If Md/Mf exceeds 17, the effect of warping reduction may be weakened. Md/Mf is preferably 3 to 16, more preferably 5 to 15, and further preferably 7 to 14.

It is preferred that the flexural modulus Md of the unidirectional fiber reinforced resin (D) 5 is 100 to 500 GPa and the flexural modulus Mf of the woven fabric fiber reinforced resin (F) 7 is 30 to 80 GPa.

If Md is less than 100 GPa, the layered body (A) 2 may be warped too much, and there is a possibility where the joining with the resin member (B) 3 may be insufficient when the resin member (B) 3 is injection molded. If Md exceeds 500 GPa, it may be difficult to handle as a base material, and the material cost may affect the product competitiveness.

If Mf is less than 30 GPa, the strength of the molded body 1 may not be sufficiently secured. If Mf exceeds 80 GPa, the layered body (A) 2 may be warped too much, and there is a possibility where the joining with the resin member (B) 3 may be insufficient when the resin member (B) 3 is injection molded.

Md is preferably 120 to 480 GPa, more preferably 180 to 400 GPa, and further preferably 220 to 320 GPa. Further, Mf is preferably 35 to 75 GPa, more preferably 45 to 65 GPa, and further preferably 50 to 60 GPa.

When the thickness of the sandwich structure member (E) 6 sandwiching both surfaces of the core layer (C) 4 with unidirectional fiber reinforced resins (D) 5 is referred to as Te (mm) and the thickness of the woven fabric fiber reinforced resin (F) 7 is referred to as Tf (mm), Te/Tf is preferably 1.2 to 40.

By increasing the thickness of the sandwich structure member (E) 6 including the unidirectional fiber reinforced resins (D) 5 with respect to the thickness of the woven fabric fiber reinforced resin (F) 7, the influence of the heat shrinkage of the woven fabric fiber reinforced resin (F) 7 can be reduced.

If Te/Tf is less than 1.2, it may be difficult to exhibit the effect of offsetting warping. If Te/Tf exceeds 40, the thickness of the molded body itself becomes thick, and there is a possibility where it may be difficult to realize thinning Te/Tf is preferably 2 to 35, more preferably 5 to 32, and further preferably 8 to 30.

It is preferable that the thickness Te of the sandwich structure member (E) 6 is 0.6 to 2 mm and the thickness Tf of the woven fabric fiber reinforced resin (F) 7 is 0.05 to 0.5 mm. It is a range that can achieve both the effect of offsetting warping and the realization of thinning If Te is less than 0.6 mm, the strength of the molded body itself may decrease. If Te exceeds 2 mm, the thickness of the molded body itself becomes thick, and there is a possibility where it may be difficult to realize thinning. If Tf is less than 0.05 mm, poor appearance may occur. If Tf exceeds 0.5 mm, the thickness of the molded body itself becomes thick, and there is a possibility where it may be difficult to realize thinning.

Preferably, Te is 0.7 to 1.8 mm, and Tf is 0.06 to 0.4 mm, more preferably, Te is 0.9 to 1.6 mm, and Tf is 0.08 to 0.3 mm, and further preferably, Te is 1 to 1.4 mm, and Tf is 0.1 to 0.2 mm.

It is preferred that the woven fabric fiber reinforced resin (F) 7 is arranged as the outermost layer on the design surface side of the fiber reinforced plastic molded body 1. Since the woven fabric fiber reinforced resin (F) 7 has a characteristic in fiber pattern, the characteristic fiber pattern can be emphasized, and by using the woven fabric fiber base material for the outermost layer, the shape pattern of the carbon fiber woven fabric can be made to stand out and a novel surface pattern can be exhibited.

It is preferred that the resin member (B) 3 is joined and formed over the entire circumference of the outer peripheral side-surface portion and/or the outer peripheral edge portion of the layered body (A) 2. As shown in FIG. 1, 4 or 5, by joining the resin member (B) 3 over the entire circumference of the outer peripheral side-surface portion of the layered body (A) 2, the molded body 1, as a whole, can realize to have a high joining strength and a small thickness.

Preferably the resin member (B) 3 has a constitution of being joined with the layered body (A) 2 to a part of a region or the entirety of the region of the flat surface portion of the outer peripheral edge portion of the layered body (A) 2 which is the side whereon the woven fabric fiber reinforced resin (F) 7 is not layered, via a joining layer (G) 8.

As shown in FIG. 5, the joining layer (G) 8 is previously attached to the surface opposite to the surface side of the layered body (A) 2 on which the woven fabric fiber reinforced resin (F) 7 is layered, and thereafter, the resin member (B) 3 is injection molded. By this, since the layered body (A) 2 is joined with the molten resin member (B) 3 via the joining layer (G) 8, it is possible to realize a high joining strength as the molded body 1. FIG. 5 shows a state in which the resin member (B) 9 is joined to the plane portion of the outer peripheral edge portion of the layered body (A) 2 via the joining layer (G) 8. As the joining layer (G) 8, a thermoplastic resin film or a non-woven fabric of a thermoplastic resin can be appropriately used.

It is preferred that the core layer (C) 4 is made of a resin foam or a porous base material comprising discontinuous fibers and a thermoplastic resin. In such a configuration, since the core layer (C) 4 is porous and has voids, it is possible to realize weight reduction and high rigidity of the molded body 1.

As the foam, a polyurethane resin, a phenol resin, a melamine resin, an acrylic resin, a polyethylene resin, a polypropylene resin, a polyvinyl chloride resin, a polystyrene resin, an acrylonitrile-butadiene-styrene (ABS) resin, a polyetherimide resin or a polymethacrylic imide resin can be preferably used. Concretely, to ensure lightness, it is preferred to use a resin having an apparent density lower than that of the skin layer, and in particular, a polyurethane resin, an acrylic resin, a polyethylene resin, a polypropylene resin, a polyetherimide resin or a polymethacrylic imide resin can be preferably used.

When a composite composed of a thermoplastic resin and discontinuous fibers is used as the core layer (C) 4, it is preferred that a core layer precursor composed of the discontinuous fibers and the thermoplastic resin is prepared, after heating and pressurizing it above the melting point or the softening point of the thermoplastic resin, the pressurization is released, and by the restoring force that tries to return to the original state when the residual stress of the discontinuous fibers is released, so-called spring back, it is expanded in the thickness direction to form voids, thereby making the composite.

As the discontinuous fibers used for the core layer (C) 4, the same kind of reinforcing fibers as the aforementioned continuous fibers can be used. The fiber length of the discontinuous fibers is preferably 1 mm or more and less than 150 mm. If it is less than 1 mm, it is difficult to use them discontinuous fibers as a base material of discontinuous fibers, and on the other hand, if the fiber length is 150 mm or more, there is a possibility that the variation of the thickness of the molded body 1 may become great. Also, as the thermoplastic resins used for the core layer (C) 4, the same kind of resins as the aforementioned thermoplastic resins can be used.

It is preferred that the warping of the fiber reinforced plastic molded body 1 is 2.0% or less. By this, when the molded body 1 is used as a housing of an electronic device, high flatness can be maintained, and thinning and high strength can be realized without contacting internal electronic components.

To ensure a high rigidity of the unidirectional fiber reinforced resin (D) 5 or the woven fabric fiber reinforced resin (F) 7, it is preferred to use the reinforcing fibers with a tensile elastic modulus of 200 to 850 GPa from the viewpoint of the rigidity of the molded body 1. If the tensile elastic modulus of the reinforcing fibers is smaller than 200 GPa, there is a possibility where it may not be possible to secure a required high rigidity while maintaining the light weight, and if it is larger than 850 GPa, because the compressive strength of the reinforcing fiber is small and it is easily broken, it is difficult to impregnate a matrix resin into the reinforcing fibers to mold a fiber reinforced resin. When the tensile elastic modulus of the reinforcing fibers is within the above-described range, it is preferable in terms of further improving the rigidity of the layered body and improving the productivity of the reinforcing fiber.

From the viewpoint of moldability and strength of the layered body (A) 2, it is preferred that the fiber weight content of the unidirectional fiber reinforced resin (D) 5 is 50 to 80% by weight, and the fiber weight content of the woven fabric fiber reinforced resin (F) 7 is 40 to 70% by weight.

If the fiber weight content of the unidirectional fiber reinforced resin (D) 5 is less than 50% by weight, there is a possibility that it may be difficult to exhibit the strength of the layered body (A) 2. If the fiber weight content of the unidirectional fiber reinforced resin (D) 5 exceeds 80% by weight, there is a possibility that it may become difficult to handle as a prepreg because the amount of fibers is too large. It is preferably 55 to 75% by weight, and more preferably 60 to 70% by weight.

If the fiber weight content of the woven fabric fiber reinforced resin (F) 7 is less than 40% by weight, there is a possibility that it may be difficult to exhibit the strength of the layered body (A) 2. If the fiber weight content of the woven fabric fiber reinforced resin (F) 7 exceeds 70% by weight, there is a possibility that the design property after molding may be impaired because the resin is poor. It is preferably 45 to 65% by weight, and more preferably 50 to 60% by weight.

It is preferred that the woven fabric contained in the woven fabric fiber reinforced resin (F) 7 has at least one weave structure selected from plain weave, twill weave, and satin weave.

It is preferred that the matrix resin of the unidirectional fiber reinforced resin (D) 5 or the woven fabric fiber reinforced resin (F) 7 comprises a thermosetting resin.

As the thermosetting resin, a thermosetting resin such as an unsaturated polyester resin, a vinyl ester resin, an epoxy resin, a phenol (resole type) resin, a urea melamine resin, a polyimide resin, a maleimide resin, or a benzoxazine resin can be preferably used. In particular, an epoxy resin is preferable from the viewpoint of mechanical properties or the heat resistance of the molded body. The epoxy resin is preferably contained as a main component of the resin to be used to exhibit its excellent mechanical properties, and concretely, it is preferably contained at an amount of 60% by weight or more per the resin composition.

It is preferred that the matrix resin of the unidirectional fiber reinforced resin (D) 5 or the woven fabric fiber reinforced resin (F) 7 comprises a thermoplastic resin.

The thermoplastic resin is preferably at least one thermoplastic resin selected from a polystyrene resin, a polyamide resin, a polycarbonate resin, a polyester resin, a polyethylene terephthalate resin, a polyethylene resin and a polypropylene resin, and it is possible to melt the resin component, thereby integrating the layered body (A) 2 and obtain a strong joining strength with the resin member.

Also, other thermoplastic resins can be preferably used. For example, can be exemplified polyester resins such as a polybutylene terephthalate (PBT) resin, a polytrimethylene terephthalate (PTT) resin, and a liquid crystal polyester resin, polyolefin resins such as a polybutylene resin, polyarylene sulfide resins such as a polyoxymethylene (POM) resin, and a polyphenylene sulfide (PPS) resin, amorphous resins such as a polymethyl methacrylate (PMMA) resin, a polyvinyl chloride (PVC) resin, a polyphenylene ether (PPE) resin, a polyimide (PI) resin, a polyamideimide (PAI) resin, a polyetherimide (PEI) resin, a polysulfone (PSU) resin, a polyethersulfone resin, and a polyarylate (PAR) resin, and as others, thermoplastic elastomers such as a phenol-based resin, a phenoxy resin, a polystyrene-based resin, a polyolefin-based resin, a polyurethane-based resin, a polyester-based resin, a polyamide-based resin, a polybutadiene-based resin, a polyisoprene-based resin, a fluorine-based resin, and a acrylonitrile-based resin, and thermoplastic resins selected from copolymers and modified products of these. Among them, a polyolefin resin is preferable from the viewpoint of lightness of the obtained molded product, a polyamide resin is preferable from the viewpoint of strength, and an amorphous resin such as a polycarbonate resin, a styrene resin, and a modified polyphenylene ether-based resin is preferable from the viewpoint of external surface appearance.

It is preferred that the resin member (B) 3 is composed of discontinuous carbon fibers or glass fibers and a thermoplastic resin. By this, the layered body (A) 2 and the resin member (B) 3 constituting the molded body 1 can be joined with a high joining strength, and the warping of the molded body 1 can be reduced.

The thermoplastic resin is preferably at least one thermoplastic resin selected from the aforementioned polystyrene resin, polyamide resin, polycarbonate resin, polyester resin, polyethylene terephthalate resin, polyethylene resin and polypropylene resin, and the resin component is melted to integrate the layered body (A) 2, and a strong joining strength with the resin member (B) 3 can be obtained.

It is preferred that the fiber weight content of resin member (B) 3 is 5 to 30% by weight. By this, the joining strength can be increased and the warping of the molded body 1 can be reduced. If it is less than 5% by weight, there is a possibility that it may be difficult to secure the strength of the molded body 1, and if it exceeds 30% by weight, there is a possibility that the filling of the resin member (B) 3 may be partially insufficient in injection molding. The fiber weight content is more preferably 8 to 28% by weight, and further preferably 12 to 25% by weight.

It is preferred that the weight average fiber length of the discontinuous carbon fibers or glass fibers is 0.3 to 3 mm. Continuous fiber and discontinuous fiber are defined. The continuous fiber indicates a state in which the reinforcing fibers contained in the molded body 1 are substantially continuously arranged over the entire length or width of the molded body 1, and the discontinuous fiber indicates a state in which the reinforcing fibers are intermittently divided and arranged. In general, unidirectional fiber reinforced resin, which is made by impregnating a resin into unidirectionally aligned reinforcing fibers, corresponds to continuous fibers, and SMC (sheet molding compound) base material used for press molding, pellet material containing reinforcing fibers used for injection molding, or the like, corresponds to discontinuous fibers.

Among the discontinuous fibers, the pellet materials used for injection molding can be classified into two types of long fiber pellets and short fiber pellets. The long fibers are defined as fibers having a weight average fiber length of 0.3 mm or more remaining in the member composed of discontinuous fibers in the molded body 1, and fibers having a weight average fiber length of less than 0.3 mm are defined as short fibers.

Since the reinforcing fibers remaining in the resin member (B) 3 are long fibers, the effect for canceling the warping of the molded body 1 can be enhanced. In short fibers having a weight average fiber length of less than 0.3 mm, there is a possibility that the strength of the resin member (B) 3 may tend to decrease. If the weight average fiber length exceeds 3 mm, the resin viscosity becomes high, and there is a possibility that it may become difficult to uniformly fill the resin member (B) 3 up to the corners of the mold for molding during injection molding. The weight average fiber length of the discontinuous carbon fibers or glass fibers is preferably 0.4 to 2.8 mm, more preferably 0.7 to 1.5 mm, and further preferably 0.9 to 1.2 mm.

It is preferred that the resin member (B) 3 has a standing wall-shaped portion at least partially. When the resin member (B) 3 arranged on the side surface of the molded body 1 shown in FIG. 4 or 5 is provided with a standing wall-shaped portion 10 in a form extending therebelow, the molded body 1 can be formed as a box-shaped body.

Next, the method of producing the fiber reinforced plastic molded body will be explained with reference to the drawings.

Figure 6:
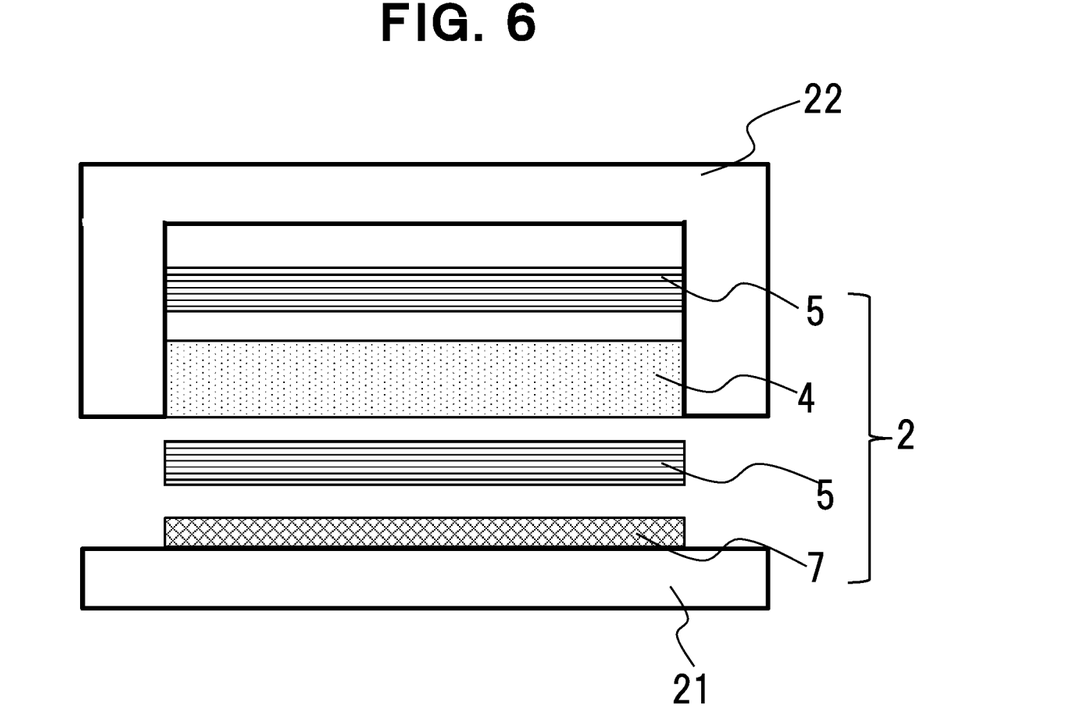
FIG. 6 is a cross-sectional view showing a state before arranging each member of a layered body (A) on a press molding lower mold in a manufacturing process of the layered body (A).
Figure 7:
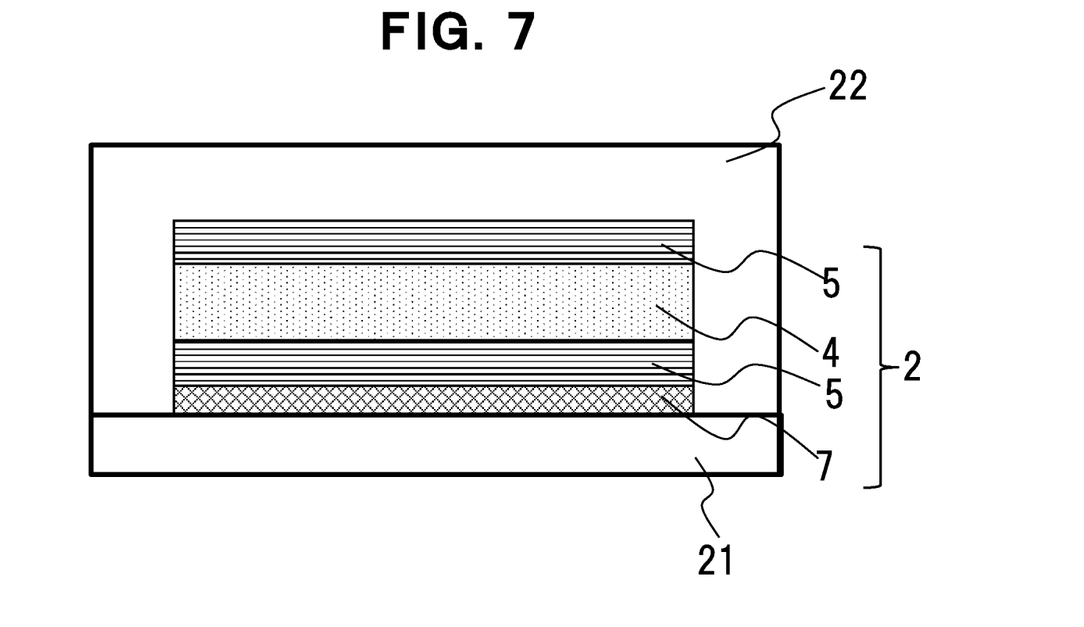
FIG. 7 is a cross-sectional view showing a state in which a press molding lower mold and a press molding upper mold are closed and a layered body (A) is formed by press molding.
Figure 8A:
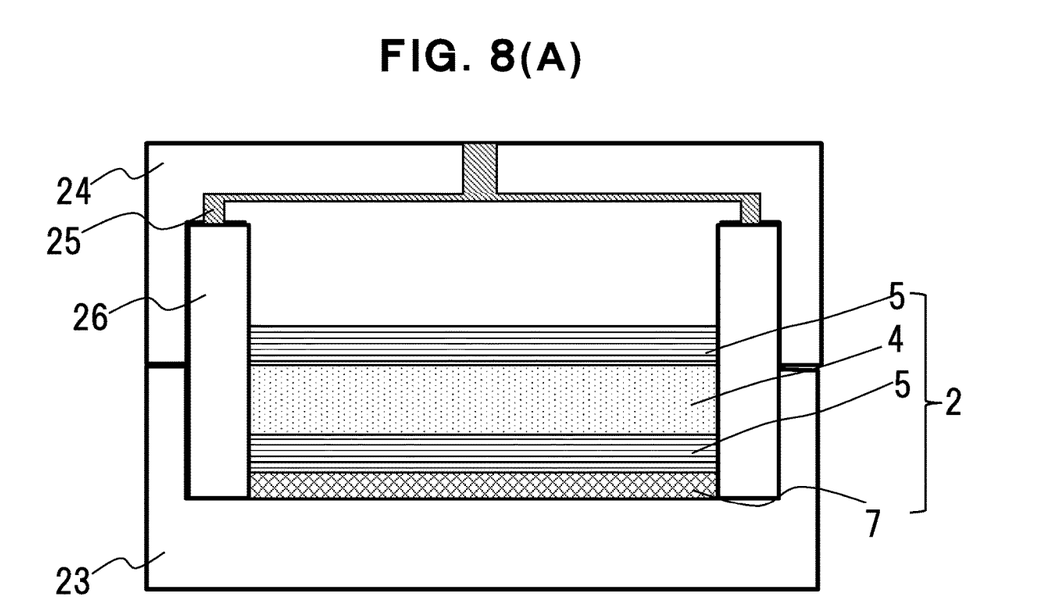
FIGS. 8(A) and (B) are process diagrams showing a production process of a fiber reinforced plastic molded body, (A) is a cross-sectional view showing a state in which a layered body (A) is arranged in a mold for injection molding, and (B) is a cross-sectional view showing a state in which a resin member (B) is injected from an injection gate port to form a fiber reinforced plastic molded body.
Figure 8B:
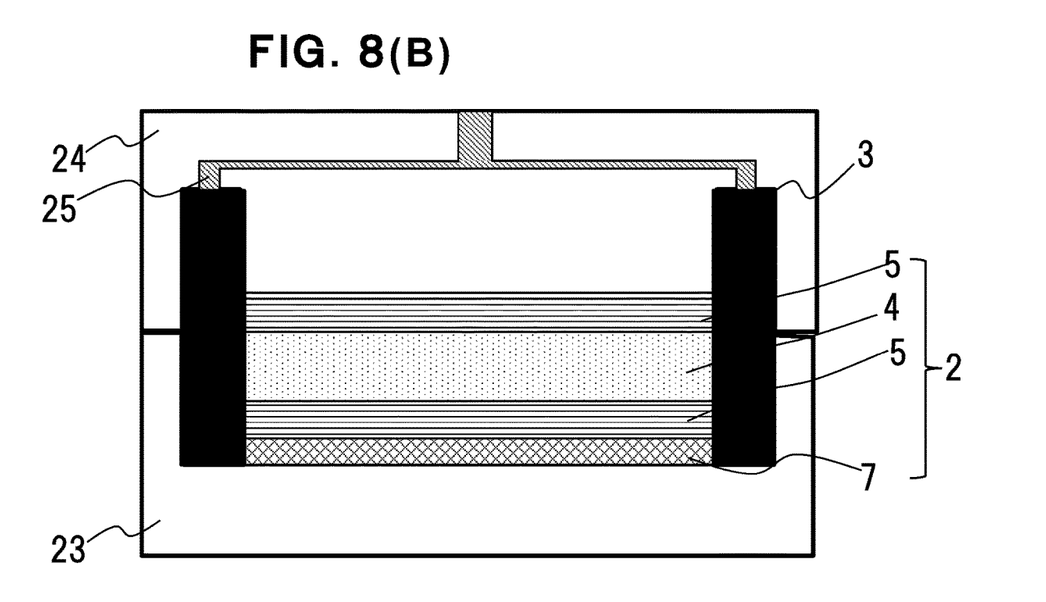

The production method of the fiber reinforced plastic molded body 1 shown in FIG. 4 is exemplified in FIGS. 6 to 8. As shown in FIG. 6, woven fabric fiber reinforced resin (F) 7, unidirectional fiber reinforced resin (D) 5, core layer (C) 4 and unidirectional fiber reinforced resin (D) 5, prepared in advance, are stacked on the press molding lower mold 21 in this order to form a precursor of layered body (A) 2. It is preferred that the woven fabric fiber reinforced resin (F) 7 and the unidirectional fiber reinforced resins (D) 5 are prepared in the form of a prepreg in which the reinforcing fibers are impregnated with a thermosetting resin, or in the form of a UD tape or a woven fabric containing a thermoplastic resin.

Thereafter, as shown in FIG. 7, the press molding upper mold 22 is lowered down to a position where it comes into contact with the unidirectional fiber reinforced resin (D) 5, and the precursor of the layered body (A) 2 is compression-molded by a constant press pressure to form the layered body. (A) 2. At this time, it is also effective to interpose a release film (not shown) between the mold and the precursor of the layered body (A) 2 to assist the releasability.

Next, as shown in FIG. 8 (A), the layered body (A) 2 is arranged between an injection-molding lower mold 23 and an injection-molding upper mold 24 having a space 26 forming the resin member (B) 3. Next, as shown in FIG. 8 (B), the resin member (B) 3 composed of reinforcing fibers and a thermoplastic resin is injection-molded from an injection gate port 25. By this, the resin member (B) 3 is joined and integrated with the side surface portion of the layered body (A) 2.

Figure 9:
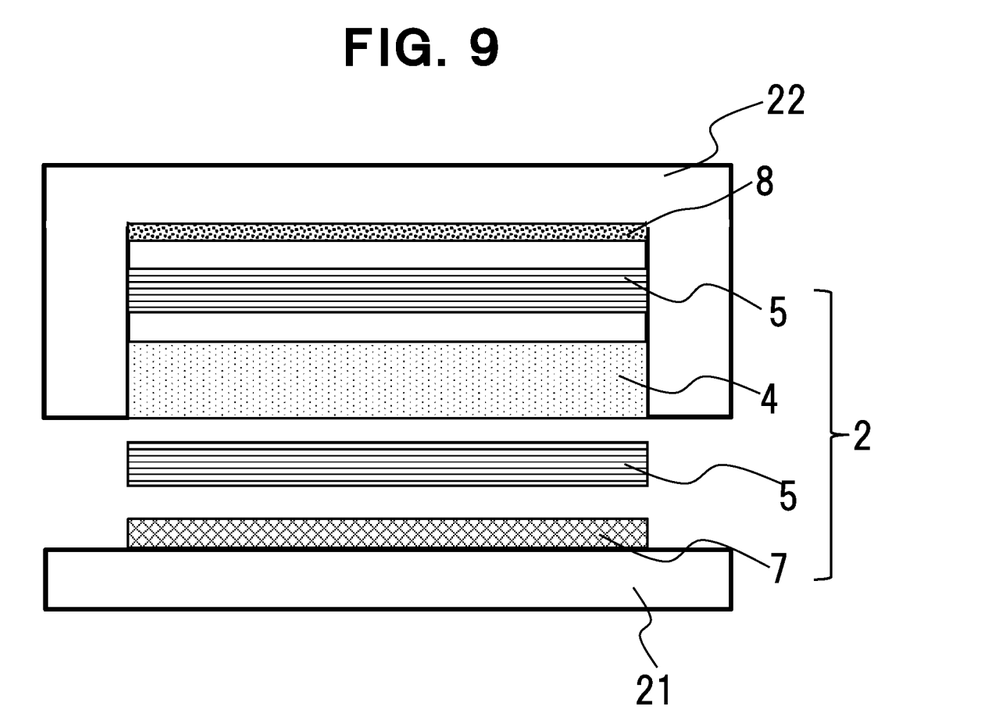
FIG. 9 is a process diagram showing a production process of a fiber reinforced plastic molded body in which a joining layer (G) is provided and a resin member (B) is joined also to a plane portion of an outer peripheral edge portion of a layered body (A), and is a cross-sectional view showing a state before arranging each member of a layered body (A) on a press molding lower mold.
Figure 10:
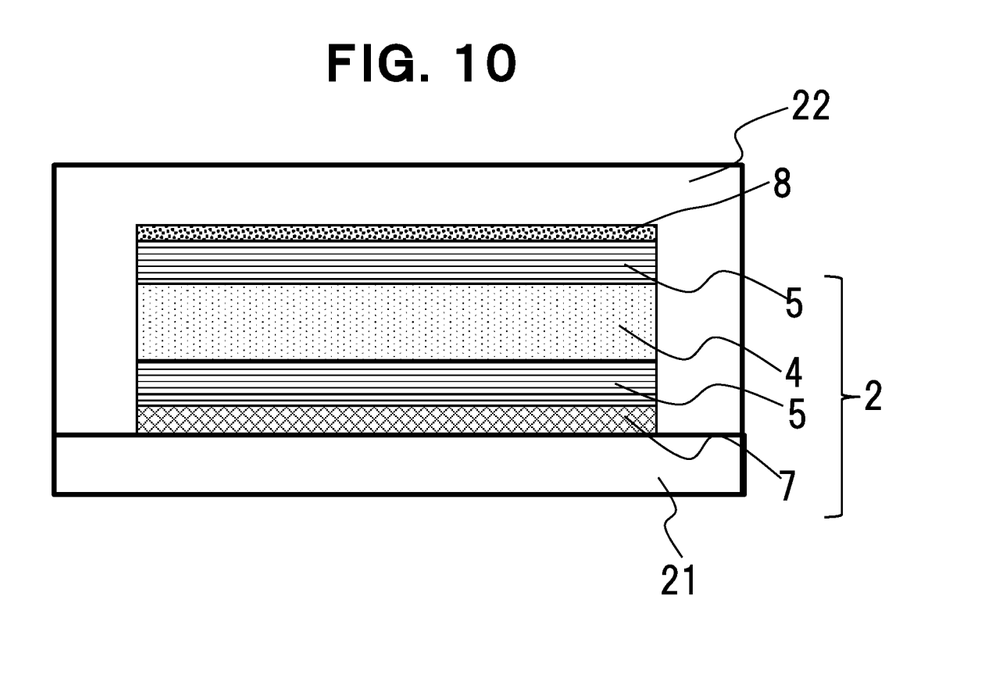
FIG. 10 is a process diagram showing a process following the process of FIG. 9, and is a cross-sectional view showing a state in which a pressed molding lower mold and a press molding upper mold are closed to form a layered body (A) by press molding.
Figure 11A:
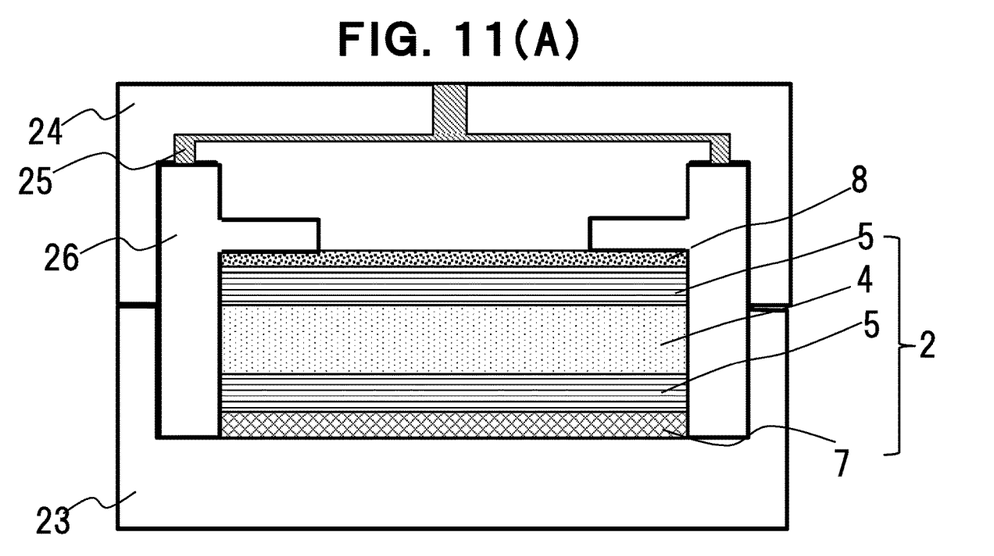
FIGS. 11(A) and (B) are process diagrams showing a production process of a fiber reinforced plastic molded body in which a resin member (B) is joined also to a plane portion of an outer peripheral edge portion of a layered body (A), (A) is a cross-sectional view showing a state in which a layered body (A) is arranged in a mold for injection molding, and (B) is a cross-sectional view showing a state in which a resin member (B) is injected from an injection gate port to form a fiber reinforced plastic molded body.
Figure 11B:
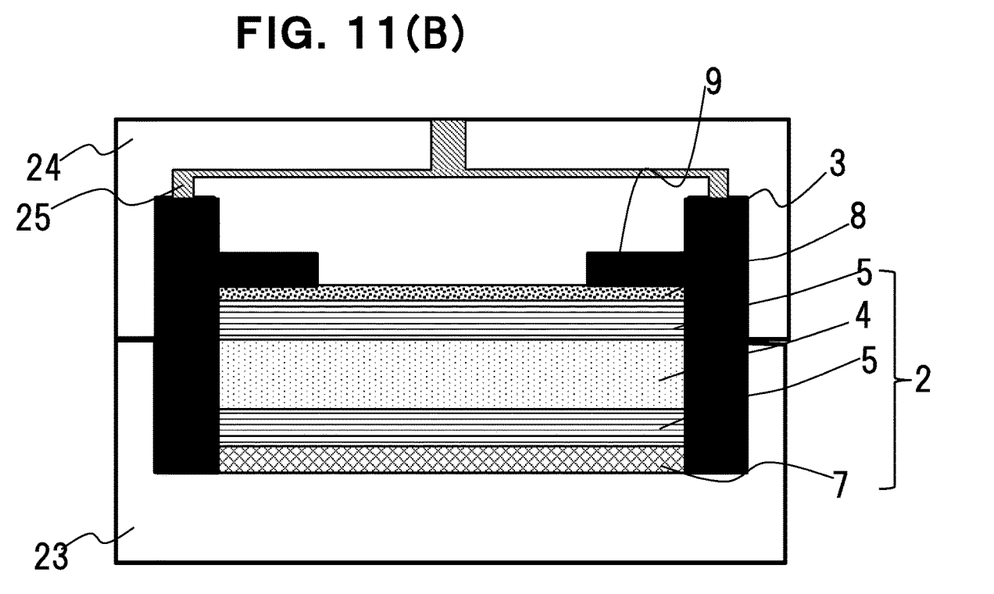

Further, a method of producing a fiber reinforced plastic molded body, in which the joining layer (G) 8 shown in FIG. 5 is provided and the resin member (B) 9 is joined also to the flat surface portion of the outer peripheral edge portion of the layered body (A) 2, are exemplified in FIGS. 9 to 11. As shown in FIG. 9, woven fabric fiber reinforced resin (F) 7, unidirectional fiber reinforced resin (D) 5, core layer (C) 4, unidirectional fiber reinforced resin (D) 5 and joining layer (G) 8, prepared in advance, are stacked on a press molding lower mold 21 in this order.

Thereafter, as shown in FIG. 10, a press molding upper mold 22 is lowered down to a position where it comes into contact with the joining layer (G) 8, and the layered body (A) 2 is compression-molded by a constant press pressure to form the layered body (A) 2.

Next, as shown in FIG. 11 (A), the layered body (A) 2 is arranged between the injection-molding lower mold 23 and the injection-molding upper mold 24 having the space 26 forming the resin member (B) 3. Next, as shown in FIG. 11 (B), the resin member (B) 3 composed of the reinforcing fibers and the thermoplastic resin is injection-molded from the injection gate port 25. By this, the resin member (B) 3 is joined and integrated with the side surface portion of the layered body (A) 2, and the plane portion of the outer peripheral edge portion of the layered body (A) 2 and the resin member (B) 9 are joined and integrated via the joining layer (G) 8.

EXAMPLES

The fiber reinforced plastic molded body 1 will be explained in more detail by way of examples, but the following examples do not limit this disclosure. First, a method of determining the properties and an example of material composition of each part of the molded body 1 will be explained.

(1) Determination of Number Average Fiber Length

The number average fiber length Ln of the reinforcing fibers contained in the resin member (B) 3 or the core layer (C) 4 is determined. A part of resin member (B) 3 or core layer (C) 4 to be determined was cut out from the integrated molded body 1 and it was heated in an electric furnace at 500° C. for 60 minutes to sufficiently incinerate and remove the resin to separate only the reinforcing fibers. 400 or more fibers were randomly extracted from the separated reinforcing fibers. The fiber lengths of these extracted reinforcing fibers were measured using an optical microscope, the lengths of 400 fibers were measured up to a unit of 1 μm, and the number average fiber length Ln was calculated using the following equation:

Number average fiber length $Ln=(\Sigma Li)/400$

Li: fiber length (mm).

(2) Determination of Fiber Weight Content

The fiber weight content of the woven fabric fiber reinforced resin (F) 7, the unidirectional fiber reinforced resin (D) 5, the core layer (C) 4 or the resin member (B) 3 constituting the layered body (A) 2 is determined by the following method. The woven fabric fiber reinforced resin (F) 7, the unidirectional fiber reinforced resin (D) 5, the core layer (C) 4 or the resin member (B) 3 to be determined was cut out from the molded body 1, and the weight w0 (g) thereof was measured. Next, the cut-out sample was heated in air at 500° C. for 1 hour to sufficiently incinerate and remove the resin component, and the weight w1 (g) of the remaining reinforcing fibers was measured. The fiber weight content (wt %) was determined using the following equation. The determination was performed at n=3, and the average value was used.

Fiber weight content (wt %)=(weight of reinforcing fibers $w1$/weight of cut-out sample $w0$)×100

(3) Determination of Flexural Rigidity and Flexural Modulus

The flexural modulus Md of unidirectional fiber reinforced resin (D) 5 and the flexural modulus Mf of woven fabric fiber reinforced resin (F) 7 were determined based on JIS K 7171. The flexural rigidity of each member was calculated by the flexural modulus obtained from the above-described determination of the flexural modulus×the moment of inertia of area/plate width.

(4) Determination of Warping

Figure 12:
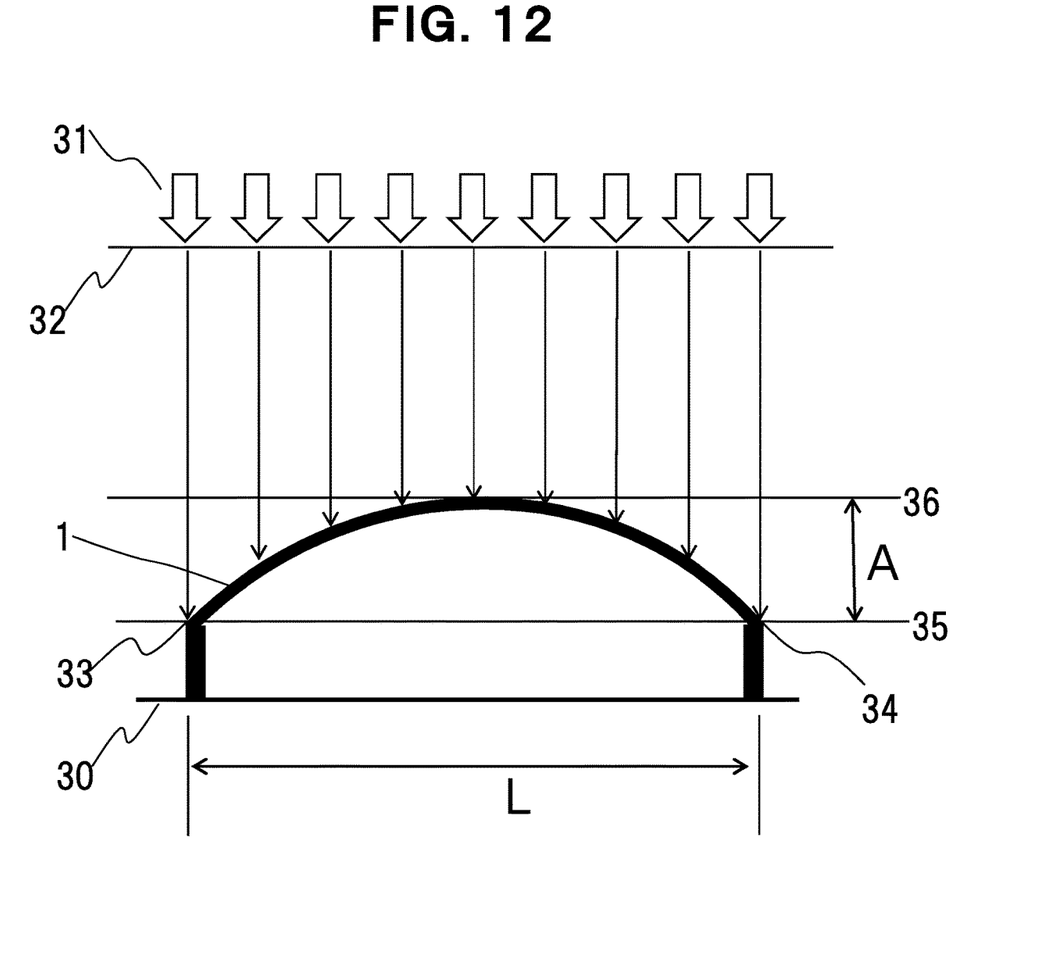
FIG. 12 is a schematic explanatory diagram showing a method of measuring an amount of warping of a fiber reinforced plastic molded body.

FIG. 12 shows a method of determining the warping state of the fiber reinforced plastic molded body 1. The warping of the molded body 1 was measured using a laser range finder supplied by BOSCH Corporation. The molded body 1 is placed on a flat plate 30 that is kept horizontal. A reference plane 32 on which the laser range finder 31 can move is prepared above the molded body 1.

The distance between the reference plane 32 and both end portions 33 and 34 of the molded body 1 is measured by the laser range finder 31, and the line connecting the end portions 33 and 34 is designated as a warping lower reference line 35. If the molded body 1 was a rectangle, for example, measurements were carried out on each of the four sides. The measurement location was performed by irradiating a laser to the vicinity of each outer peripheral end portion of the four sides of the layered body (A) 2. This end portion is an end portion of the layered body (A) 2 and does not include the resin member (B) 3.

Next, the laser 31 is moved between both end portions 33 and 34 at constant intervals, and the distance between the reference plane 32 and the molded body 1 at each location is measured. FIG. 12 exemplifies seven points of an odd number. At the place where the distance between the reference plane 32 and the molded body 1 is the shortest, the tangent line parallel to the warping lower reference line 35 is defined as a warping upper reference line 36. When the distance between both end portions 33 and 34 is referred to as L (mm) and the distance between the warping lower reference line 35 and the warping upper reference line 36 is referred to as A (mm), the warping was determined by equation (1):

Warping=$(A/L)\times100[\%]$ (1).

Material Composition Example 1-1: Preparation of Unidirectional Fiber Reinforced Resin (D) 5

As unidirectional fiber reinforced fiber (D) 5 in which PAN-based carbon fiber bundles were arranged in one direction in a sheet form and impregnated with an epoxy resin, a unidirectional prepreg (D-1) (supplied by Toray Industries, Inc., P3452S-15, carbon fiber weight content: 67%, carbon fiber tensile elastic modulus: 235 GPa, thickness: 0.15 mm), a unidirectional prepreg (D-2) (supplied by Toray Industries, Inc., P3452S-10, carbon fiber weight content: 67%, carbon fiber tensile elastic modulus: 235 GPa, thickness: 0.10 mm) and a unidirectional prepreg (D-3) (supplied by Toray Industries, Inc., P12453F-16, carbon fiber weight content: 67%, carbon fiber tensile elastic modulus: 550 GPa, thickness: 0.15 mm) were prepared. Further, a unidirectional prepreg (D-4) (supplied by Toray Industries, Inc., P12453F-11, carbon fiber weight content: 67%, carbon fiber tensile elastic modulus: 550 GPa, thickness: 0.10 mm) was prepared.

Material Composition Example 1-2: Preparation of Woven Fabric Fiber Reinforced Resin (F) 7

As the woven fabric fiber reinforced resin (F) 7, a woven fabric prepreg (F-1), composed of a woven carbon fiber having a tensile elastic modulus of 230 GPa and an epoxy resin having a glass transition temperature of 135° C., and having an areal weight of 198 g/m², a carbon fiber content of 56% by weight and a thickness of 0.10 mm, was prepared.

Material Composition Example 2-1: Preparation of Core Layer (C) 4

A core layer (C-1) 4 composed of foamed polypropylene (supplied by Toray Industries, Inc., RC2012W) was prepared.

Material Composition Example 2-2: Preparation of Core Layer (C) 4

As a porous base material, a core layer (C-2) 4, composed of a discontinuous fibers (supplied by Toray Industries, Inc., T700S, number average fiber length of carbon fibers: 5 mm) and a thermoplastic resin (polypropylene), and having a weight content of the discontinuous fibers of 30% by weight, was prepared.

Material Composition Example 3: Preparation of Resin Member (B) 3

Glass fiber pellets for injection molding (supplied by Teijin Co., Ltd., GXV3540-UI, glass fiber, number average fiber length: 0.2 mm, polycarbonate resin, fiber weight content: 40% by weight) were prepared, and referred to as resin member (B-1) 3.

Glass fiber pellets for injection molding (supplied by Toray Industries, Inc., A503-F1, glass fiber, number average fiber length: 0.2 mm, PPS resin, fiber weight content: 30% by weight) were prepared, and referred to as resin member (B-2) 3.

Material Composition Example 4: Preparation of Joining Layer (G) 8

Polyester resin ("Hytrel" (registered trademark) 4057, supplied by DuPont-Toray Co., Ltd.) was charged from a hopper of a twin-screw extruder, melt-kneaded by the extruder, and then extruded from a T-shaped die. Thereafter, it was cooled and solidified by taking it up with a chill roll at 60° C. to obtain a polyester resin film having a thickness of 0.05 mm. This was used as the thermoplastic joining layer (G) 8.

Example 1

Using the unidirectional prepreg prepared in Material composition example 1-1 and the foamed polypropylene prepared in Material composition example 2-1, a precursor of a rectangular sandwich structure member (E) 6 having a size of 300 mm×300 mm stacked in the order of [unidirectional prepreg (D-1) 0°/unidirectional prepreg (D-2) 90°/foamed polypropylene/unidirectional prepreg (D-2) 90°/unidirectional prepreg (D-1) 0°] was prepared. Next, 2 plies of the woven fabric prepreg (F-1) 7 with a size of 300 mm×300 mm×0.1 mmt prepared in Material composition example 1-2 were stacked on one side of the precursor of the sandwich structure member (E) 6 to prepare a precursor of the layered body (A) 2. The flexural modulus Md of the unidirectional fiber reinforced resin (D) 5 was determined as the elastic modulus of the cured prepreg "unidirectional prepreg (D-1) 0°/unidirectional prepreg (D-2) 90°" stacked on the core layer (C) 4.

Next, as shown in FIG. 6, this precursor of the layered body (A) 2 was sandwiched between release films (not shown) and placed on the rectangular press molding lower mold 21 having a size of 300 mm×300 mm. Next, as shown in FIG. 7, after setting the press molding upper mold 22, it was placed on a board surface having a board surface temperature of 150° C., the board surface was closed, and heat pressing was performed at 3 MPa. After 5 minutes had passed from the pressurization, the board surface was opened to obtain a layered body (A-1) 2 which was a carbon fiber reinforced resin plate having a thickness of 0.5 mm and had a rectangular flat plate shape having a size of 300 mm×300 mm.

Next, as shown in FIG. 8 (A), the layered body (A-1) 2 was arranged in the space formed by the injection molding lower mold 23 and the injection molding upper mold 24, and as shown in FIG. 8 (B), the resin member (B-1) 3 obtained in Material composition example 3 was injection-molded from the injection gate port 25 so that Am1/Am2 became 20 to produce a fiber reinforced plastic molded body 1. When the amount of warping of the obtained fiber reinforced plastic molded body 1 was determined, the warping was within 0.5% with respect to the length of each of the four sides of the rectangle, which was a level at which there was no problem in actual use. Table 1 summarizes and shows the material composition, physical characteristics and the like of the fiber reinforced plastic molded body 1. The amount of warping shown in Table 1 represents the maximum value among the amounts of warping on four sides. The same applies to the subsequent examples.

Example 2

Example 2 was carried out using the material formulations and dimensions shown in Table 1, and it was carried out under the same conditions as in Example 1 other than a condition where the precursor of the rectangular sandwich structure member (E) 6, having a size of 300 mm×300 mm and using unidirectional prepregs (D-3) and unidirectional prepregs (D-4) as the unidirectional fiber reinforced resins (D) 5 and stacked in the order of [unidirectional prepreg (D-3) 0°/unidirectional prepreg (D-4) 90°/foamed polypropylene/unidirectional prepreg (D-4) 90°/unidirectional prepreg (D-3) 0°], was prepared. The warping of the obtained fiber reinforced plastic molded body 1 was small and there was no problem in level on actual use. The results are summarized and shown in Table 1.

Example 3

Example 3 was carried out under the same conditions as in Example 1 other than a condition where Tf, Am1 and Am2 were employed as the material formulations and dimensions shown in Table 1. The warping of the obtained fiber reinforced plastic molded body 1 was small and there was no problem in level on actual use. The results are summarized and shown in Table 1.

Example 4

Example 4 was carried out using the material formulations and dimensions shown in Table 1, and the precursor of layered body (A) 2 was prepared in a manner similar to that in Example 2 other than a condition where the joining layer (G) 8 prepared in Material composition example 4 was layered.

As shown in FIGS. 9 and 10, this precursor of the layered body (A) 2 was placed on the mold 21 and heated and pressurized under the same conditions as in Example 1 to obtain a layered body (A-4) 2 which was a carbon fiber reinforced resin plate having a rectangular flat plate shape with a thickness of 0.5 mm and a size of 300 mm×300 mm.

Next, as shown in FIG. 11 (A), the layered body (A-4) 2 was arranged in the space formed by the injection molding lower mold 23 and the injection molding upper mold 24, and as shown in FIG. 11 (B), the resin member (B-1) 3 obtained in Material composition example 3 was injection-molded from the injection gate port 25 so that Am1/Am2 became 25 to produce a fiber reinforced plastic molded body 1. The warping of the obtained fiber reinforced plastic molded body 1 was small and there was no problem in level on actual use. The results are summarized and shown in Table 1.

Comparative Example 1

Comparative Example 1 was performed using the material formulations and dimensions shown in Table 1. The molded body was low in Am2/Am1, and the warping of the obtained fiber reinforced plastic molded body 1 was large, with which there was a problem in actual use. The results are summarized and shown in Table 1.

Comparative Example 2

Comparative Example 2 was performed using the material formulations and dimensions shown in Table 1. The molded body was high in Am2/Am1, the thickness of the obtained fiber reinforced plastic molded body 1 was large, and the warping of the molded body 1 was large, with which there was a problem in actual use. The results are summarized and shown in Table 1.

TABLE 1

|  |  | Symbol | Unit | Example 1 | Example 2 | Example 3 | Example 4 | Comparative Example 1 | Comparative Example 2 |
|---|---|---|---|---|---|---|---|---|---|
| Flexural modulus | Unidirectional fiber reinforced resin (D) | Md | GPa | 100 | 300 | 100 | 300 | 100 | 100 |
|  | Woven fabric fiber reinforced resin (F) | Mf | GPa | 80 | 80 | 80 | 80 | 80 | 80 |
|  |  | Md/Mf |  | 1.3 | 3.8 | 1.3 | 3.8 | 1.3 | 1.3 |
| Thickness | Sandwich structure (E) | Te | mm | 1.2 | 0.8 | 2.0 | 0.8 | 1.8 | 1.15 |
|  | Woven fabric fiber reinforced resin (F) | Tf | mm | 0.1 | 0.4 | 0.05 | 0.4 | 0.1 | 0.1 |
|  |  | Te/Tf |  | 12.0 | 2.0 | 40.0 | 2.0 | 18.0 | 11.5 |
| Resin amount | Amount of resin present in R1 | Am1 | mm$^3$ | 12 | 40 | 10 | 10 | 10 | 10 |
|  | Amount of resin present in R2 | Am2 | mm$^3$ | 240 | 80 | 100 | 250 | 18 | 260 |
|  |  | Am2/Am1 |  | 20 | 2 | 10 | 25 | 1.8 | 26 |
|  | Warping |  | % | 0.5 | 1 | 0.8 | 0.6 | 5 | 3 |

INDUSTRIAL APPLICABILITY

Our fiber reinforced plastic molded body can be effectively used for automobile interiors/exteriors, electrical/electronic equipment housings, bicycles, structural materials for sports goods, aircraft interior materials, boxes for transportation and the like.

The invention claimed is:

1. A fiber reinforced plastic molded body comprising:
a layered body (A) that is a planar structure body comprising at least a fiber reinforced resin; and
a resin member (B) joined to a part of a region or the entirety of the region on an outer peripheral side-surface portion and/or an outer peripheral edge portion of the layered body (A),
wherein the layered body (A) comprises: a sandwich structure member (E) in which a core layer (C) is sandwiched on both surfaces thereof by unidirectional fiber reinforced resins (D) each constituted from a unidirectional continuous fiber and a matrix resin and each having one or two or more layers, and
a woven fabric fiber reinforced resin (F) of one or two or more layers, constituted from a woven fabric fiber and a matrix resin and layered on a surface of one of the fiber reinforced resins (D), and when the layered body (A) is divided into equal halves in its thickness direction, an amount of the resin member (B) present in a region (R1) which is a side from a dividing center line whereon the woven fabric fiber reinforced resin (F) is layered is referred to as Am1, and an amount of the resin member (B) present in a region (R2) which is a side whereon the woven fabric fiber reinforced resin (F) is not layered is referred to as Am2, Am2/Am1 is 10 to 25.

2. The fiber reinforced plastic molded body according to claim 1, wherein a flexural rigidity of the sandwich structure member (E) is larger than a flexural rigidity of the woven fabric fiber reinforced resin (F).

3. The fiber reinforced plastic molded body according to claim 1, wherein, when a flexural modulus of the unidirectional fiber reinforced resin (D) is referred to as Md (GPa) and a flexural modulus of the woven fabric fiber reinforced resin (F) is referred to as Mf (GPa), Md/Mf is 1.2 to 17.

4. The fiber reinforced plastic molded body according to claim 1, wherein a flexural modulus Md of the unidirectional fiber reinforced resin (D) is 100 to 500 GPa, and a flexural modulus Mf of the woven fabric fiber reinforced resin (F) is 30 to 80 GPa.

5. The fiber reinforced plastic molded body according to claim 1, wherein, when a thickness of the sandwich structure member (E) is referred to as Te (mm) and a thickness of the woven fabric fiber reinforced resin (F) is referred to as Tf (mm), Te/Tf is 1.2 to 40.

6. The fiber reinforced plastic molded body according to claim 1, wherein a thickness Te of the sandwich structure member (E) is 0.6 to 2 mm, and a thickness Tf of the woven fabric fiber reinforced resin (F) is 0.05 to 0.5 mm.

7. The fiber reinforced plastic molded body according to claim 1, wherein the woven fabric fiber reinforced resin (F) is arranged as an outermost layer on a design surface side of the fiber reinforced plastic molded body.

8. The fiber reinforced plastic molded body according to claim 1, wherein the resin member (B) is joined and formed over an entire circumference of the outer peripheral side-surface portion and/or the outer peripheral edge portion of the layered body (A).

9. The fiber reinforced plastic molded body according to claim 1, wherein the resin member (B) is joined to the layered body (A) in a part of a region or the entirety of the region on a plane portion of the outer peripheral edge portion of the layered body (A), which is a side whereon the woven fabric fiber reinforced resin (F) is not layered, via a joining layer (G).

10. The fiber reinforced plastic molded body according to claim 1, wherein the core layer comprises a resin foam or a porous base material made from discontinuous fibers and a thermoplastic resin.

11. The fiber reinforced plastic molded body according to claim 1, wherein a warping of the fiber reinforced plastic molded body is 2% or less.

* * * * *